United States Patent
Tirosh

(10) Patent No.: US 9,341,927 B1
(45) Date of Patent: May 17, 2016

(54) SLIDE PROJECTOR HOUSING WITH MOUNT FOR DETACHABLE LENS AND STROBE

(71) Applicant: Udi Josef Tirosh, Givat Brener (IL)

(72) Inventor: Udi Josef Tirosh, Givat Brener (IL)

(73) Assignee: Orili Ventures Ltd., Givat Brener (IL)

( * ) Notice: Subject to any disclaimer, the term of this patent is extended or adjusted under 35 U.S.C. 154(b) by 43 days.

(21) Appl. No.: 14/150,564

(22) Filed: Jan. 8, 2014

Related U.S. Application Data

(60) Provisional application No. 61/750,375, filed on Jan. 9, 2013.

(51) Int. Cl.
*G03B 15/05* (2006.01)
*G03B 21/00* (2006.01)
*G03B 15/00* (2006.01)

(52) U.S. Cl.
CPC .............. *G03B 21/001* (2013.01); *G03B 15/00* (2013.01); *G03B 15/05* (2013.01)

(58) Field of Classification Search
CPC ................................ G03B 15/05; G03B 15/15
USPC ........... 353/9, 18, 22, 68, 102, 103, 108, 117, 353/119
See application file for complete search history.

(56) References Cited

U.S. PATENT DOCUMENTS

| | | | |
|---|---|---|---|
| 2004/0141162 A1* | 7/2004 | Olbrich | G06F 3/017 353/119 |
| 2005/0088621 A1* | 4/2005 | Ikeuchi | 353/15 |
| 2007/0019166 A1* | 1/2007 | Iwasaki | 353/34 |
| 2010/0026818 A1* | 2/2010 | Yang | H04M 1/0235 348/207.99 |

FOREIGN PATENT DOCUMENTS

WO    2009068524 A1    6/2009

* cited by examiner

*Primary Examiner* — Sultan Chowdhury
(74) *Attorney, Agent, or Firm* — Loginov & Associates, PLLC; William A. Loginov

(57) ABSTRACT

This invention provides a system and method for projection of an image on any surface, employing a lightweight (typically polymer) housing that removably encloses a slide holder allowing for quick change of the slide. The housing includes a central channel, and allows for the mounting of a conventional camera-mounting-base lens at a front end and the insertion of a standard form factor photographic strobe/flash in the rear end. Light from the strobe passes down the channel, through the slide and is projected by the lens onto the surface. This housing is mountable on a standard tripod. The housing is straightforward to use, with the strobe effect being provided directly by the strobe unit. The system and method avoids the need of a camera body and desirably enables the user to employ one or more lenses, which are often less expensive and already available in a photographer's equipment inventory.

17 Claims, 9 Drawing Sheets

SLIDE PROJECTOR HOUSING WITH MOUNT FOR DETACHABLE LENS AND STROBE

RELATED APPLICATIONS

This application claims the benefit of U.S. Provisional Application Ser. No. 61/750,375, filed Jan. 9, 2013, entitled SLIDE PROJECTOR HOUSING WITH MOUNT FOR DETACHABLE LENS AND STROBE, the entire disclosure of which is herein incorporated by reference.

FIELD OF THE INVENTION

This invention relates to photographic slide projectors, and more particularly to slide projectors that employ a conventional camera lens and strobe flash adapted for use with a camera hot shoe.

BACKGROUND OF THE INVENTION

The use of a slide projector to generate image effects on a surface, such as a wall, a ceiling, a screen or even a person, is often desirable. A variety of arrangements are available to provide such a projection. For example, a purpose-built slide projector can be employed. However, these units can be large, heavy and often do not lend themselves to portability or tripod mounting. In addition, they often lack the ability to provide a strobe effect. Published International Patent Application No. WO 2009/068524 A1, entitled DEVICE AND METHOD FOR PROJECTING A GRAPHIC REPRESENTATION ON A PROJECTION SURFACE, by von Bismarck, teaches a projection unit that mounts a slide at the back of a conventional single lens reflex (SLR) camera with a photographic strobe flash behind the slide. The camera then, in essence, acts in reverse, causing the light passed through the slide and lens to project as an enlarged image on the surface as the strobe and shutter are triggered. The lens can be focused to provide a sharp image on the surface. Likewise, where a zoom lens is fitted to the camera, the size of the image, relative to focal distance can be varied.

The arrangement of von Bismarck is effective, but requires a dedicated and often delicate/expensive SLR to be used to generate images. Where a plurality of images is to be projected or where the photographer cannot afford to dedicate one or more cameras to a projection task, von Bismarck is somewhat impractical. More generally, von Bismarck's structure requires one to remove the strobe to change the projected film, and is limited to the use of raw film with sprocket holes. Thus, von Bismarck is not adapted to project through other types of media, such as unframed transparencies, home-printed transparency materials and the like.

Thus, it is desirable to provide a system and method for allowing the stroboscopic projection of images onto a surface with appropriate focus and (optionally) zoom, that does not require an expensive fixed projection unit and/or camera body. This system and method should be easy to use, portable and tripod-mountable. It is further desirable that the projection system and method allow for a variety of transparent media to be projected-through, in addition to raw film, such as unframed transparency film and slices of transparencies produced, for example, using a home printer.

SUMMARY OF THE INVENTION

This invention overcomes disadvantages of the prior art by providing a system and method for projection of an image on a surface, which employs a lightweight (typically polymer) housing, that removably encloses a slide holder (clamshell) allowing for quick change of a framed slide (e.g. a plurality of slides/holders being available to the user). The housing includes a central channel, and allows for the mounting of a conventional (e.g. Canon 35 mm) camera-mounting-base lens at a front end and the insertion of a standard form factor photographic strobe/flash in the rear end. Light from the strobe passes down the channel, through the slide and is projected by the lens onto the surface. By way of example, the slide can conform to International Organization for Standardization (ISO) 1007 or another standard. In addition, the holder is sized and arranged to accommodate unframed slides and/or home-printed transparency media that can be free of sprocket holes. This housing arrangement is mountable on a standard tripod and/or light stand using a conventional female-threaded base thereon. The housing is straightforward to use, being free of any electrical connections and/or shutter mechanisms, with the strobe effect (if any) being provided directly by the strobe unit and/or other industry-standard triggering mechanisms. More particularly, a variety of transparent media can be readily installed in, and removed from, the holder free of the need to disassemble the strobe or lens from the overall assembly. The system and method further avoids the need of a dedicated camera body and desirably enables the user to employ one or more lenses, which are often less expensive and already available in a photographer's equipment inventory.

In an illustrative embodiment a system for a slide projection housing device with a mount for a detachable lens and strobe comprising a housing having a slot for a removably inserting a slide holder for a photographic slide; an aperture for removably inserting a strobe light; and an mounting base for removably attaching a lens. The strobe light projects light into the slide projection housing, the light passing through the photographic slide and the lens for projection as a projected image onto any surface. The projected image is projected onto a surface of a picture or other image to create a combined image for photography of the combined image by a photographer. The photographic slide is removably inserted into the slide holder and can be is placed into at least one of the faces of the slide holder and both faces are joined together. The first face includes alignment structures constructed and arranged to engage the corresponding alignment structures on the second face. At least one of the first face and the second face includes spring tabs that engage a portion of the slot under pressure. This provides a method for photographing an image wherein the image is projected from a slide housing comprising the steps of projecting, with a strobe light, a light into the slide housing along an optical axis; retaining a photographic slide so that light passes through the slide along the optical axis; and passing the light passing through the slide into a commercially available lens removably mounted on a mount of the housing so that light is focused at a predetermined size, focus and resolution on the surface.

BRIEF DESCRIPTION OF THE DRAWINGS

The invention description below refers to the accompanying drawings, of which.

DETAILED DESCRIPTION

Figure 1:
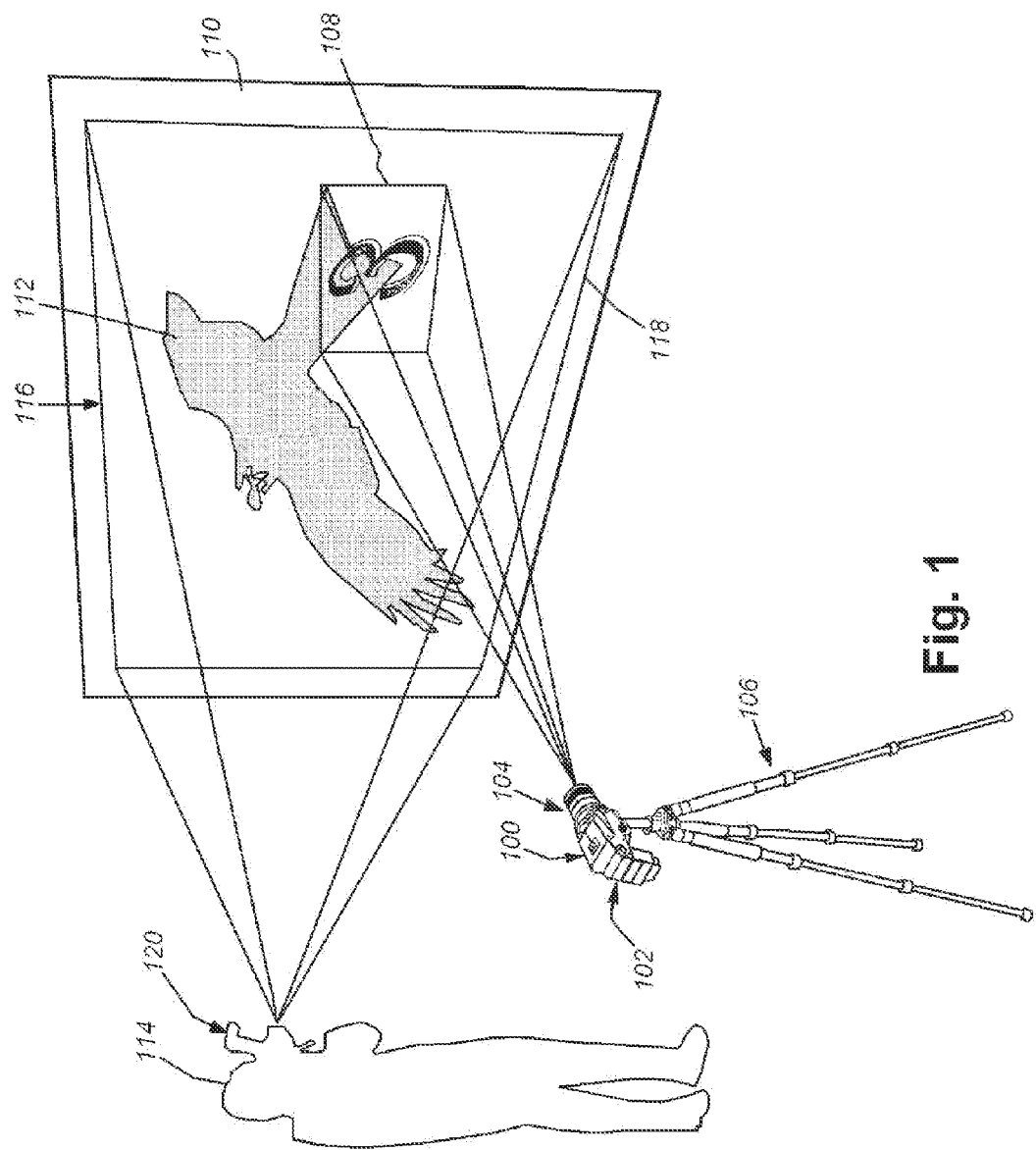
FIG. 1 is a perspective view of a slide projector housing with attached strobe and lens, mounted on a tripod and projecting an image for use by a photographer according to an illustrative embodiment.

FIG. 1 depicts an illustrative slide projector housing device 100 with an attached exemplary strobe flash (also termed simply "strobe") 102 and coaxially mounted camera lens 104 mounted atop a tripod or light stand 106. The overall housing device assembly is shown projecting an exemplary image 108 (e.g. a stylized number "3") onto a screen 110 that is provided with another image 112, such as a picture/poster mounted on a wall, for photography. In operation, an exemplary photographer 114 is photographing the combined image 116. The detachable strobe is a conventional commercially available strobe light. The detachable lens is also a conventional, commercially available camera lens that is connected to the front of the housing 100. The projected image 108 falls within the field-of-view 118 of the photographer's camera 120. The projected image 108 is derived from an image on an exemplary photographic slide (described more fully below) that resides within the body of the housing 100. For the purposes of this description, the term "slide" should be taken broadly to include any transparent media through which light can pass to form an image and which is sized and arranged to be mounted within the holder 200 (described further below). Thus, the term can also include raw film segments (with or without (free of) sprocket holes), home-printed transparencies, and other appropriate media. The projected image 108 is created by the strobe 102 producing light that passes into the housing 100 and through the slide (not shown) that in turn passes through the lens 104 and is emitted directionally at the screen 110.

The strobe 102 emits light in pulses. In an alternate embodiment, the light can be adapted to emit a more steady and sustained beam. The strobe can be provided with a variety of colors (for example using colored light sources, filters, etc.) in different visible (and/or invisible—IR for example) wavelengths that create different artistic effects for the projected image as required and desired by the photographer. The light intensity of the strobe can be arranged to vary between weaker to stronger light emission for the overall contrast of the projected image 108. As noted above, the lens is a conventional 35 mm camera lens with a conventional SLR mounting base. The focus function on the lens can be used to sharpen or blur the projected image 108 by manual or remote manipulation. Likewise the lens' aperture setting can be used to vary the image sharpness. It is contemplated that the lens focus can be changed automatically by a program and attached drive mechanism so as to vary the resolution of the projected image while the photographer 114 photographs the changing image effects. As described further below the housing arrangement is mountable on a standard tripod using a conventional female-threaded base situated thereon for connection to a threaded screw post, which is commonly employed on the conventional tripod 106 or similar mounting.

Figure 2:
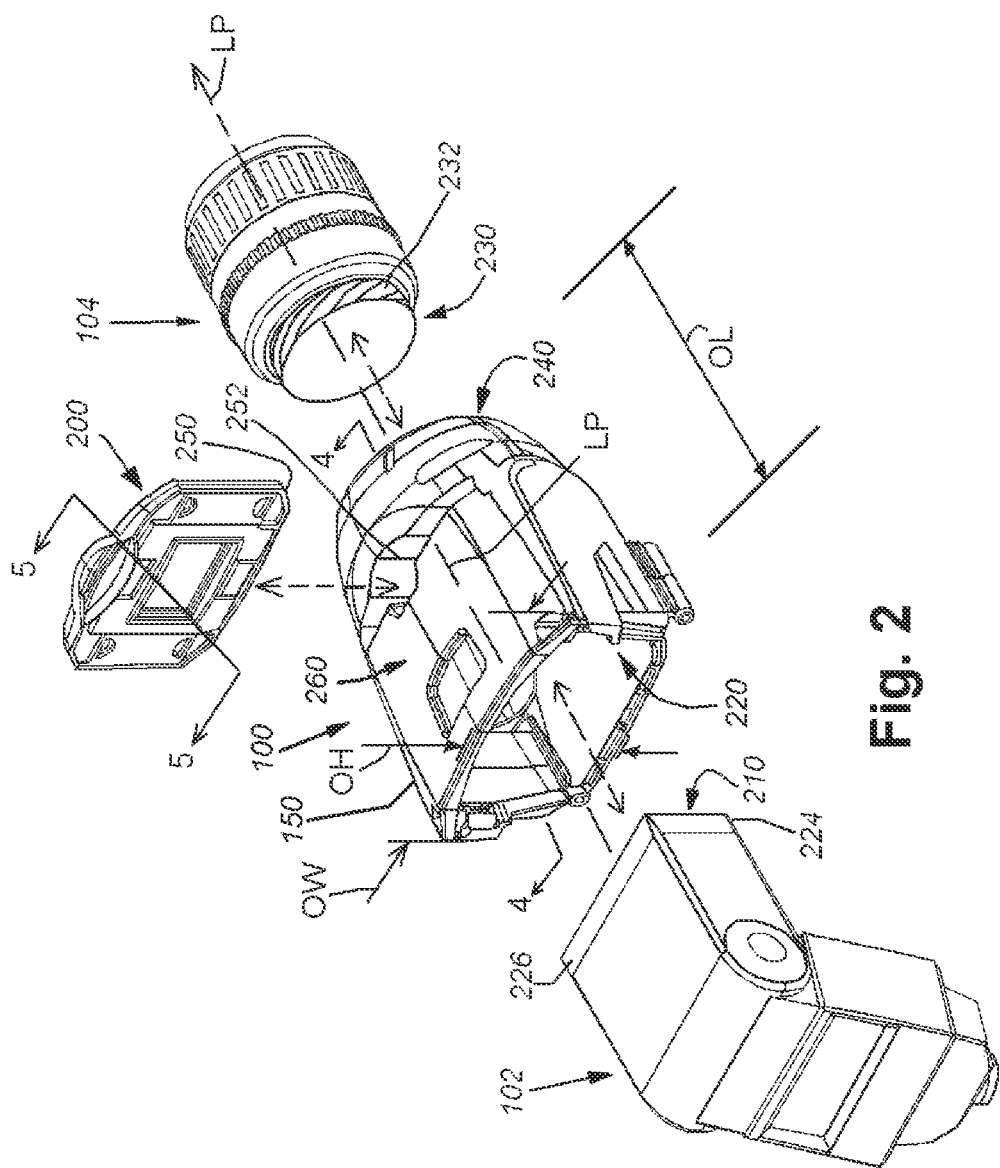
FIG. 2 is an exploded perspective view showing the components of the slide projector housing, according to the illustrative embodiment.

FIG. 2 is an exploded view of the housing 100 and the components that include the strobe 102, the body of the housing 150, the slide holder 200 and the lens 104. The housing body 150 is opaque and is composed of relatively lightweight rigid materials, including natural and/or synthetic rigid polymers, metal alloys (e.g., aluminum) or a combination thereof. The housing body 150 has a weight of approximately 180 grams. The housing body 150 has an overall length OL of approximately 120 millimeters, an overall height OH of approximately 80 millimeters and an overall width OW of approximately 110 millimeters. The weight and dimensions can vary on the materials used, the size of the strobe and a different lens system. It is expressly contemplated that larger or smaller housings using appropriately sized components can be provided for use in different artistic applications as desired by the photographer.

Figure 4:
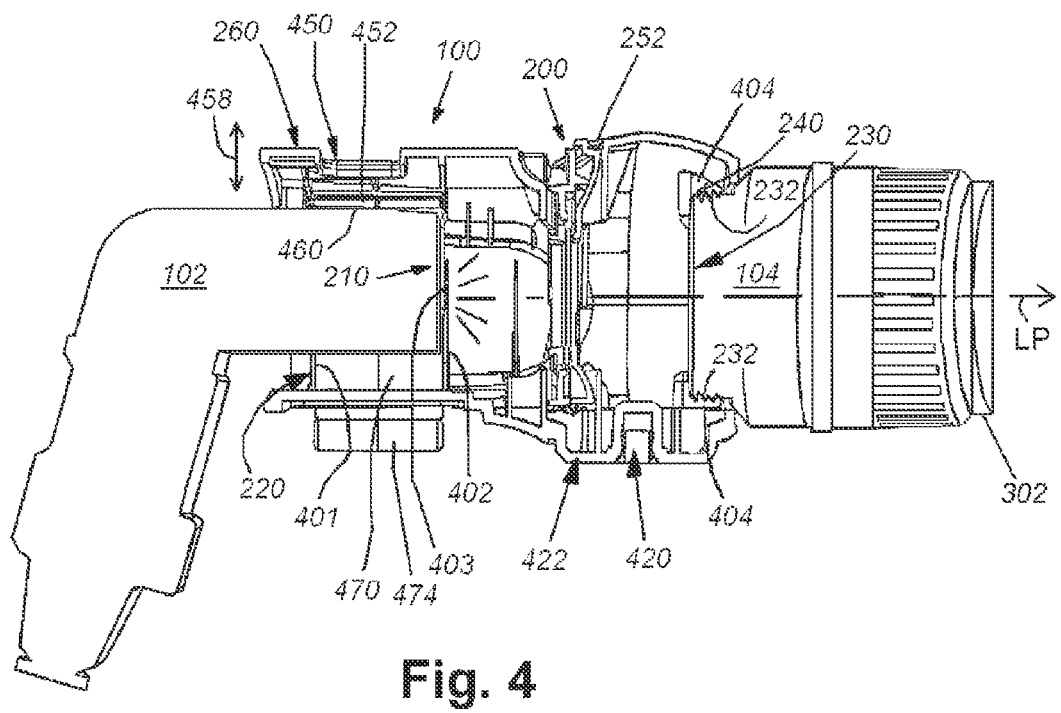
FIG. 4 is a cross section view of the slide projector housing taken along line 4-4 of FIG. 2, according to the illustrative embodiment.
Figure 4A:
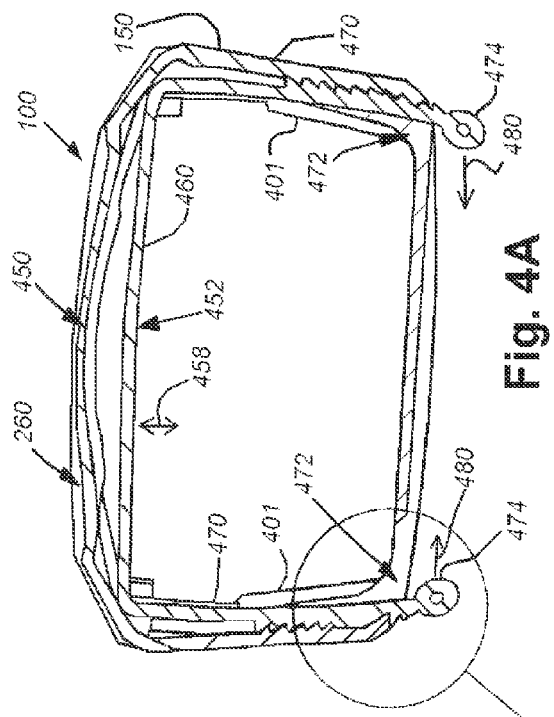
FIG. 4A is a cross section taken along line 4A-4A of FIG. 3.
Figure 4B:
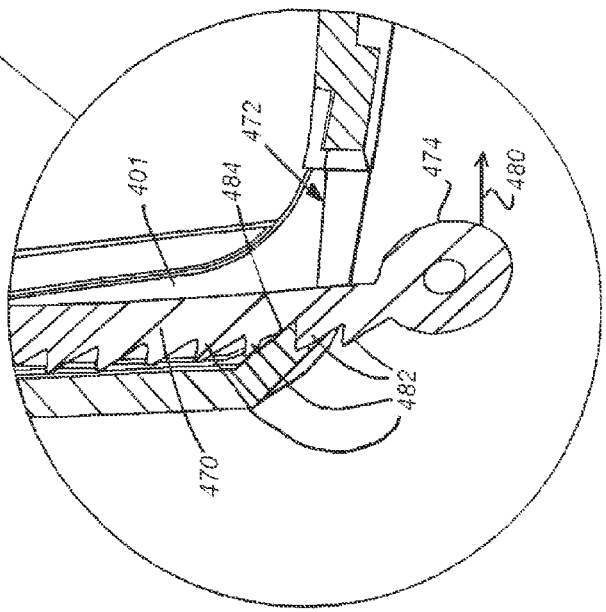
FIG. 4B is a more detailed, fragmentary cross section of the ratchet mechanism of the strobe compression plate assembly of FIG. 4A.

The strobe 102 engages the housing by placing the emitting end 210 of the strobe into the strobe aperture 220. The strobe 102 is then held in place by a frictional fit within the strobe aperture 220. With reference also to FIG. 4, to seat the strobe 102, the photographer inserts the front emitting end 210 into the strobe aperture 220 and pushes the strobe 102 until the strobe end 210 makes contact with the limiting wall 402 and the bottom side 224 of the strobe engages the housing bottom. With reference also to FIGS. 4A and 4B, the top section 260 of the housing 150 includes a port 450 that allows a finger to press upon and/or observe the location of a compression plate assembly 452. The compression plate assembly 452 is movable upwardly and downwardly (arrow 458) to allow the roof 460 of the compression plate assembly 452 to be brought into close engagement with the top surface 226 of the strobe 102 (as shown in FIG. 4). This provides appropriate compression to retain the strobe in place. As shown, the compression plate assembly 452 includes side walls 470 that pass through slots 472 in the bottom of the housing 150. The sidewalls 470 are captured between the side ribs 401, 403 that allow up/down sliding but restrain against front/rear motion. Each sidewall 470 includes a stylized bottom pull tab 474 that allows the user to elastically squeeze the walls toward each other (arrows 480), and move the plate assembly up and down. The slots 472 have sufficient clearance to allow the walls to move/flex a predetermined distance. As shown in FIG. 4B, the compression plate assembly 452 is restrained at a predetermined elevation (in engagement with the strobe) by a ratchet assembly. The ratchet assembly consists of a series of saw tooth steps 482 formed along the outside of the sidewall 470. The steps 482 selectively engage a pawl 484 at the outer edge of the slot 470. The steps 482 are sloped to allow the compression plate assembly to be freely drawn downwardly against the pawl into an appropriate engagement with the strobe. After the selected step is engaged by the pawl, the compression plate assembly 452 can be released and moved upwardly by squeezing the tabs together (to disengage them from the pawl), and raising the assembly toward the top 260 of the housing. In embodiments, one or more locations along the aperture and/or compression plate can include an elastomeric material (e.g. rubber feet) that assists in frictionally retaining the strobe once the top section is compressed against it. In alternate embodiments other mechanisms can be used to secure the strobe within the housing. For example, a removable elastic strap can be used to engage the rear of the strobe body, and bias the strobe body forwardly into the aperture. Alternatively, a foam packing can be used against the roof to secure the strobe in place.

The coaxially mounted lens 104 is connected to the housing by appropriately sized threading 232 that are arranged according to conventional camera lens mounts that are based upon photography standards in the industry. In this embodiment the mount is standardized to a 35 mm digital SLR standard available from Canon of Japan. Other mount standards and lens sizes, such as those available from Nikon of Japan or Leica of Germany can be substituted in alternate embodiments. The lens threading 232 engages threading grooves (described more fully below) situated around the lens aperture 240 so that the locking end 230 of the lens is removably secured to the housing 100. The slide holder 200 contains a changeable slide (not shown) and is inserted into the slide groove 252 located in the top of the housing 100. The bottom edge 250 of the slide holder 200 is aligned with groove 252 and the slide housing is vertically placed within the housing. The bottom edge 250 is typically provided with a live hinge along the edge to join the respective faces. The slide holder 200 can be held in place by frictional fit, a locking mechanism or by gravity. It is expressly contemplated that the slide housing groove can be constructed in the side of the housing so that the slide holder 200 is inserted laterally. The slide holder 200 is aligned so that the slide is perpendicular to the axis of the path of the light LP (optical axis of the system). It is contemplated that the slide housing groove can be constructed for limited rotational movement away from the perpendicular orientation relative to the axis LP for different effects in the projected image.

Figure 3:
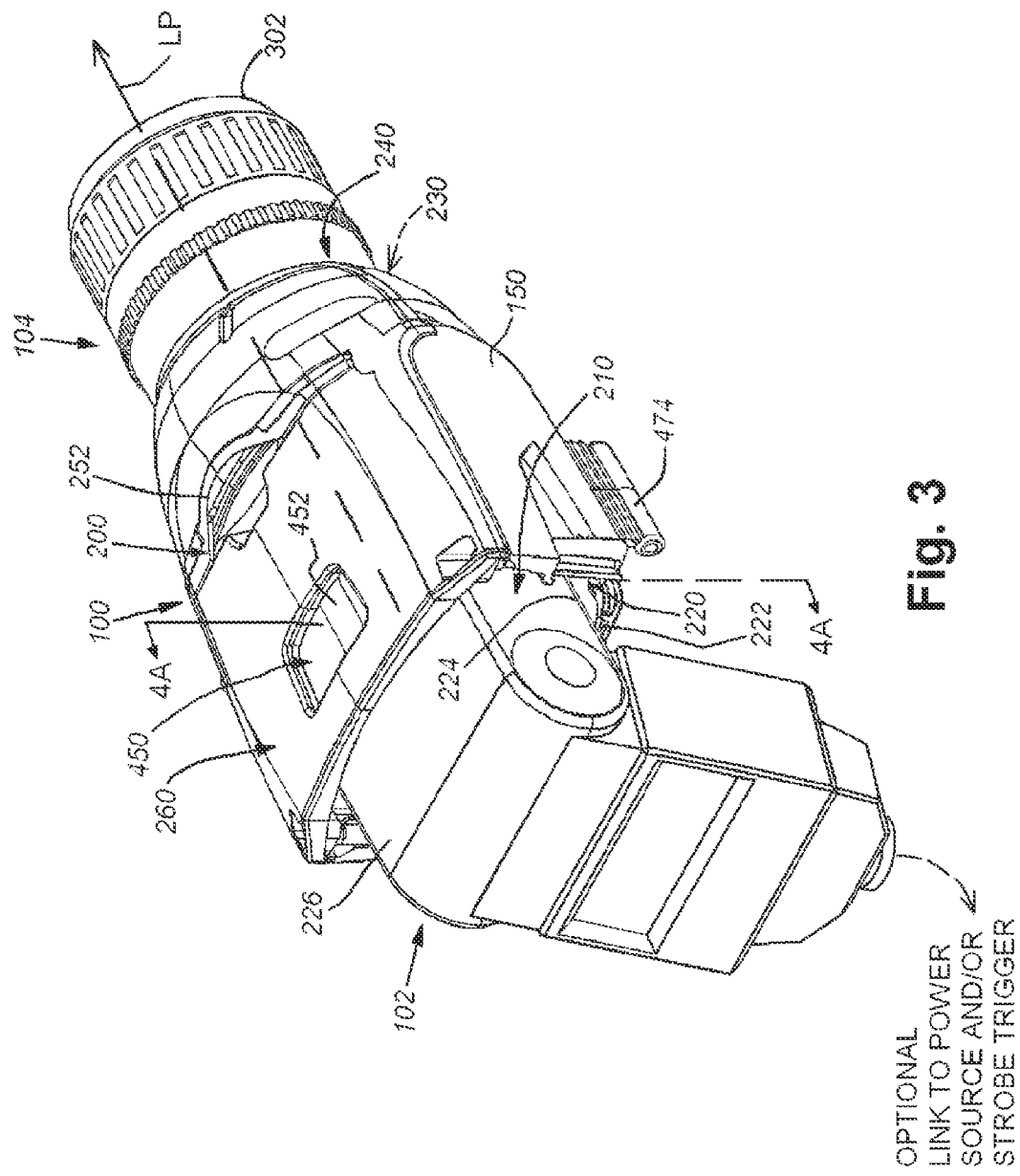
FIG. 3 is a perspective view showing the attached components of the slide projector housing, according to the illustrative embodiment.

FIG. 3 is a view of the components of FIG. 2 as assembled and securely arranged for use as a projector. The strobe 102 as depicted is provided with an energy storage battery that is removable and/or rechargeable. It is contemplated that the photographer can use an optional power cable to connect the strobe 102 to a power source and/or the camera's external strobe trigger. In this manner the strobe is activated in synchronization with the shutter of the photographer's camera. This trigger link can be wired or wireless in various embodiments. As noted above, the lens can be manually or remotely focused so as to project a focused or blurred image. An appropriate attachment for driving lens focus, with associated control link would be used to auto-focus (and/or auto-zoom—where applicable) the lens. In general, for most applications, manual focus and manual zoom (where applicable) is sufficient.

It is also contemplated that removably attached light filters, polarizers and/or other light-conditioning devices can be attached to the front of the lens 302 to further alter the projected image. For example, an applied coating of an oil on the lens 302 to make the emitted image more diffuse, or a green filter to alter the image. It is further contemplated that a prismatic diffusion lens can be used to break up the projected image into a disarticulated artistically significant presentation.

FIG. 4 is a cross section view of the assembled projector of FIG. 3. The strobe is depicted as being frictionally held in place by the compressed top section, and has been directed forward into the strobe aperture 220 so that the front end 210 is in contact with the limiting wall 402 along the floor of the housing body 150. The limiting wall 402 is constructed low enough so that light will pass unimpeded from the strobe 102, and includes a pair of opposing side ribs 403 that extend upwardly from the wall 402. Each side rib 403 (as well as the rear-most side rib 401) provides a sufficient side clearance for the strobe to be inserted and (in the case of front rib 403) for light to pass.

As also shown in FIG. 4, the lens 104 is secured by the engagement of the lens threads 232 with the threading of the receiving grooves 404 constructed around the inner perimeter of the centrally open lens aperture 230. As also depicted in the cross section, the bottom side of the housing includes a threaded hole 420 within a raised base 422. This hole 420 is threaded to receive a standard mounting post (e.g. a standard ⅜-16 internal thread). Other forms of mounting arrangements and multi-piece mounts are expressly contemplated—for example, a sub-base threaded to the tripod that removably attached by clips, etc. to the main housing.

Figure 5:
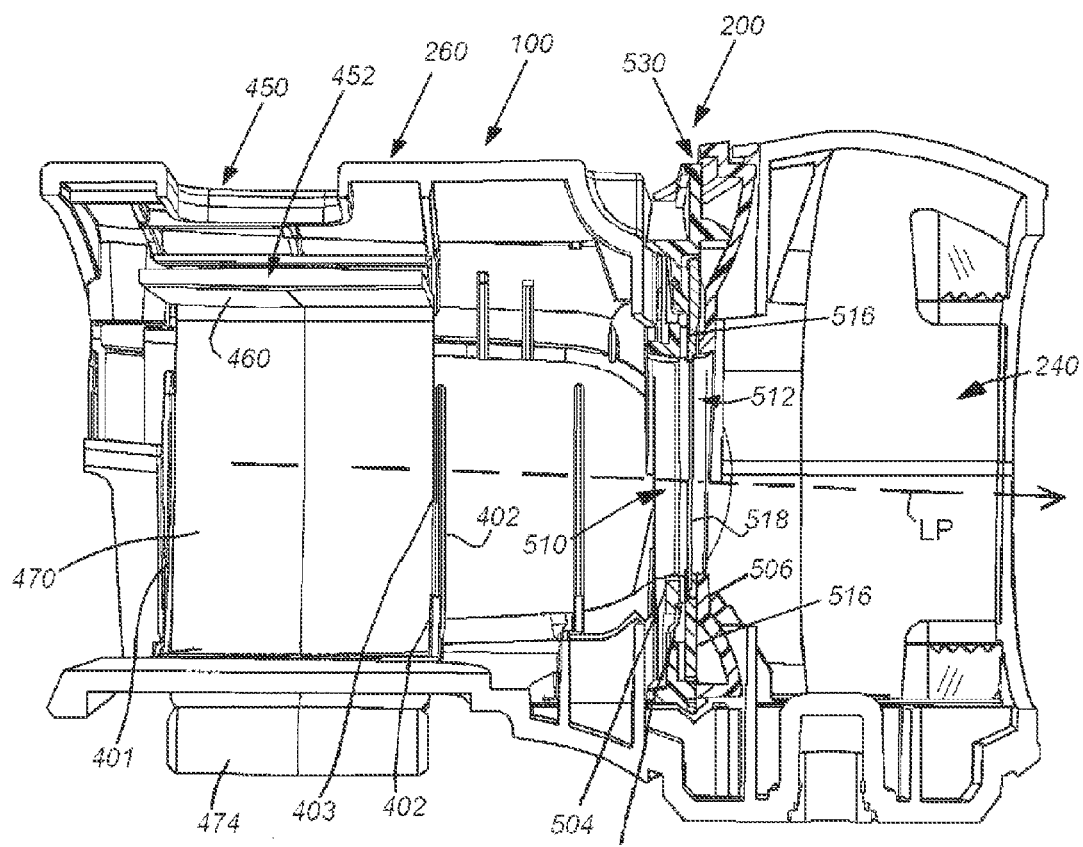
FIG. 5 is a close up cross section view of the slide projector housing taken along line 5-5 of FIG. 2, showing the slide holder, according to the illustrative embodiment.

FIG. 5 is a close-up image of the cross-section of FIG. 4 and shows the detail of the slide holder 200. The slide holder 200 defines a "clamshell" structure that is provided with two faces 504 and 506 enclosing a slide 502 with centrally located apertures 510, 512. A slide 502 having a frame and a central transparent photographic image can been removably placed within the holder 200 and is secured by the engagement of the rear housing face 504 and the front housing face 506. The slide 502 is comprised of a surrounding frame 516 and a captured image 518. In an embodiment, the faces 504 and 506 are each two discrete halves of the overall slide holder 200, which are placed together around a slide 502. The faces 504, 506 of the slide holder 200 are adapted to be hinged apart, and a selected slide 502 or other transparent media (e.g. raw film, a printed transparency, etc.) is placed onto one of the faces and held therein until the opposing face is closed over it. In an embodiment, the top end of the holder includes a pair of overlapping, resilient lips that form a snap fit at a junction 530 on the upper side/edge of the holder 200. It is further contemplated that, in an alternate embodiment, a live hinge is omitted and the housing faces can be formed as two discrete halves that are fully separated from each other to receive the slide or other media and are engaged together after the slide is installed therein.

The slide housing provides that light emitted by the strobe (not shown) following the axis of the light path LP passes through a centrally located opening 510 in the rear housing face 504, the slide 502 and a centrally located opening 512 in the front housing face 506.

Figure 6:
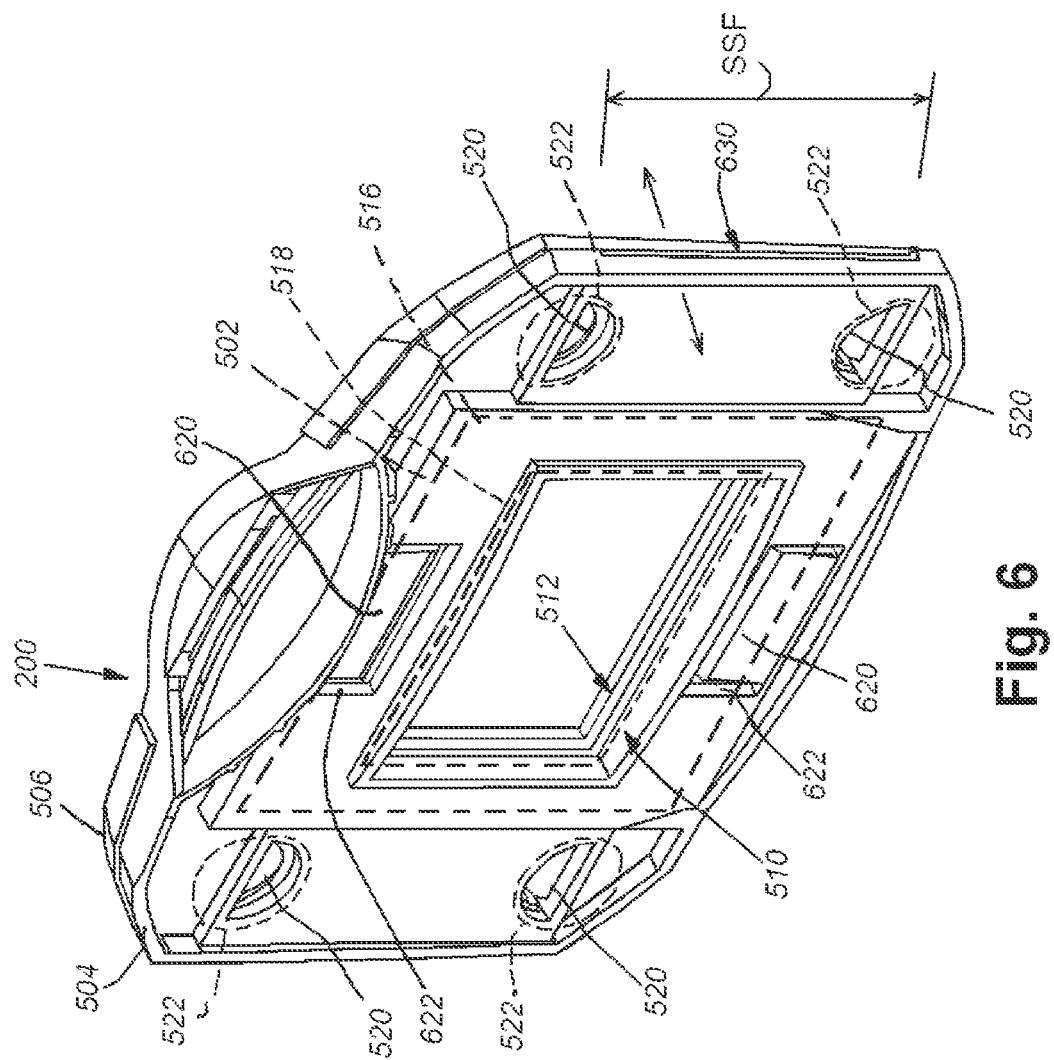
FIG. 6 is a perspective view of a slide holder, according to the illustrative embodiment.

The slide housing is depicted more particularly in FIG. 6. As noted above, the slide holder 200 can opened and closed by drawing the halved fully apart or by action of a live hinge. The apertures 510, 512 in the respective faces 504, 506 provide a window for the movement of projected light from the strobe (not shown) through the retained slide 502 and into the lens 104 (not shown in FIG. 5) for projection. As noted above, the slide housing is comprised of two halves, faces 504, 506 that (in this embodiment) are removably attached by the engagement four (and at least two) semi-circular alignment tabs 520. In the illustrative embodiment, the slide holder 200 is provided with four alignment tabs 520 on face 504. In general, the alignment tabs 520 are sized and arranged to define a rail for the mounting of raw film and/or home-printed transparencies so that they are properly presented to the aperture of the holder. It is expressly contemplated that the slide housing can be provided with a greater or lesser number of alignment tabs than that depicted. The alignment tabs 520 are shown engaging opposing receiving wells 522 on face 506 to provide a continuous alignment structure. Also in an illustrative embodiment, the well that retains a framed slide can include unitarily molded spring tabs 620 on the face 504 that accommodate the variation in thickness that is sometimes encountered in differing slides. The tabs provide a slight biasing force against the thinnest slide expected to be mounted, and flex outwardly within their slots 622 to accommodate thicker slides.

As also shown in FIG. 6, a gap 630 is provided along each side of the holder (when fully closed) to accommodate a raw film piece or home-printed transparency between the tabs 520. The spacing SF between tabs can be adapted to define a mounting rail sufficient for a standard-width film piece-such as 35 millimeter film.

Figure 7:
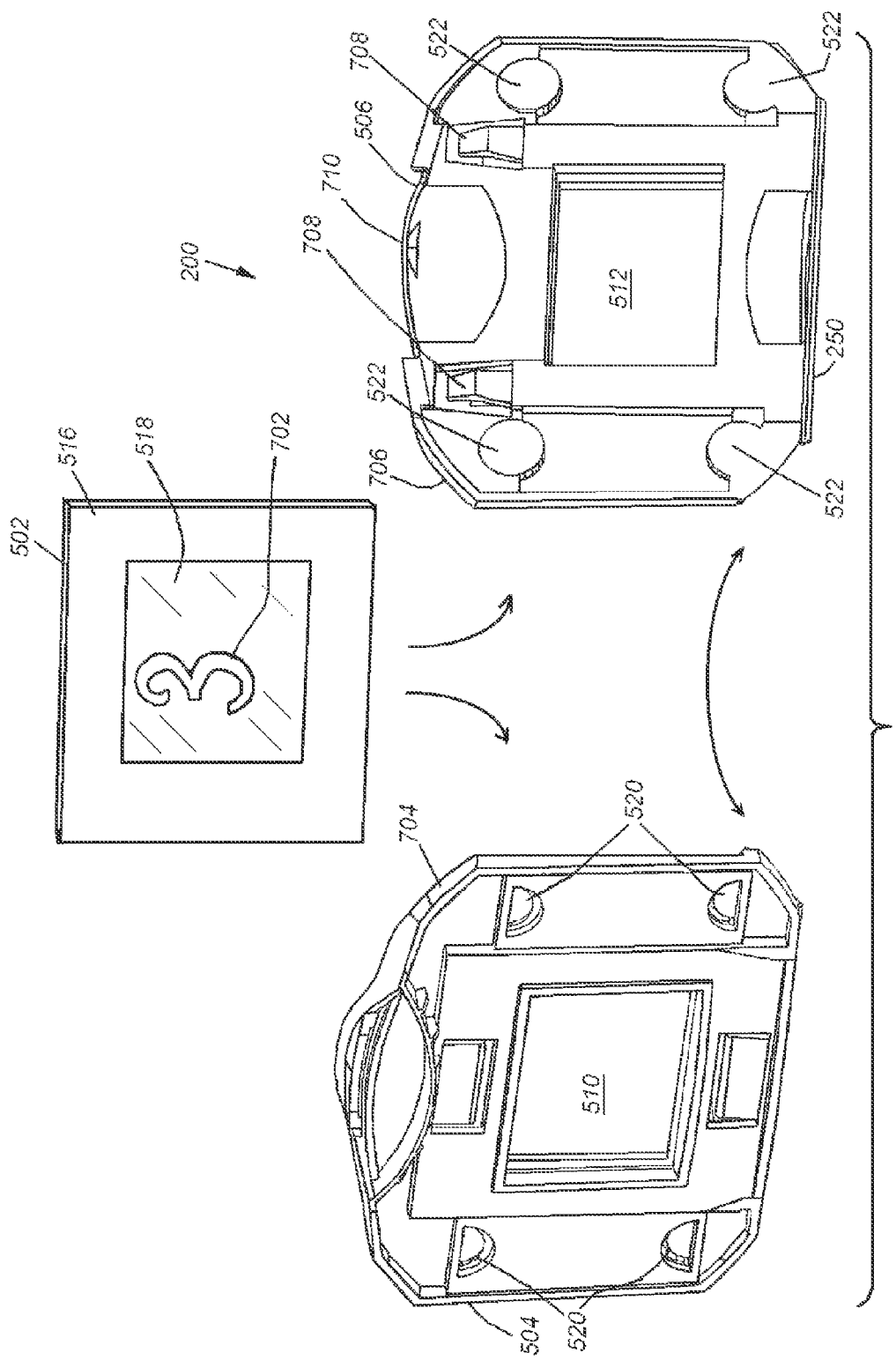
FIG. 7 is multi-sided perspective view of a slide holder, with a slide, according to the illustrative embodiment.

FIG. 7 depicts the two slide housing faces 504, 506 in multi-view illustration (i.e. front and rear external sides). In operation, the slide 502 with an image 702 is positioned in an appropriate central aperture on one of faces 504, 506 (with the inner edge of the aperture sized and arranged to receive and seat the slide). The faces are then engaged together in alignment, so that the outer perimeter edge 704 of face 504 confronts the outer perimeter edge 706 of face 506. The semicircular alignment tabs 520 are sized appropriately for entering the respective receiving wells 522 as shown to create an aligned engagement between the joined faces 504, 506. Face 506 is provided with two unitary (molded) spring tabs 708 defining a slight outward projection. These spring tabs 708 act as retaining springs when the slide holder 200 is engaged within the receiving slot of the housing. In particular, the spring tabs 708 are compressed when the slide holder 200 is placed into the slide groove 252 (described more fully above) within the housing 100. The compression of the spring tabs 708 provides a secure fit within the housing 100 but allows for ready removal of the slide holder 200 with modest force by pulling on the raised portion 710. The spring tabs also ensure that the two faces 504 and 506 remain in close engagement with each other when the holder 200 is mounted within the housing.

Figure 8:
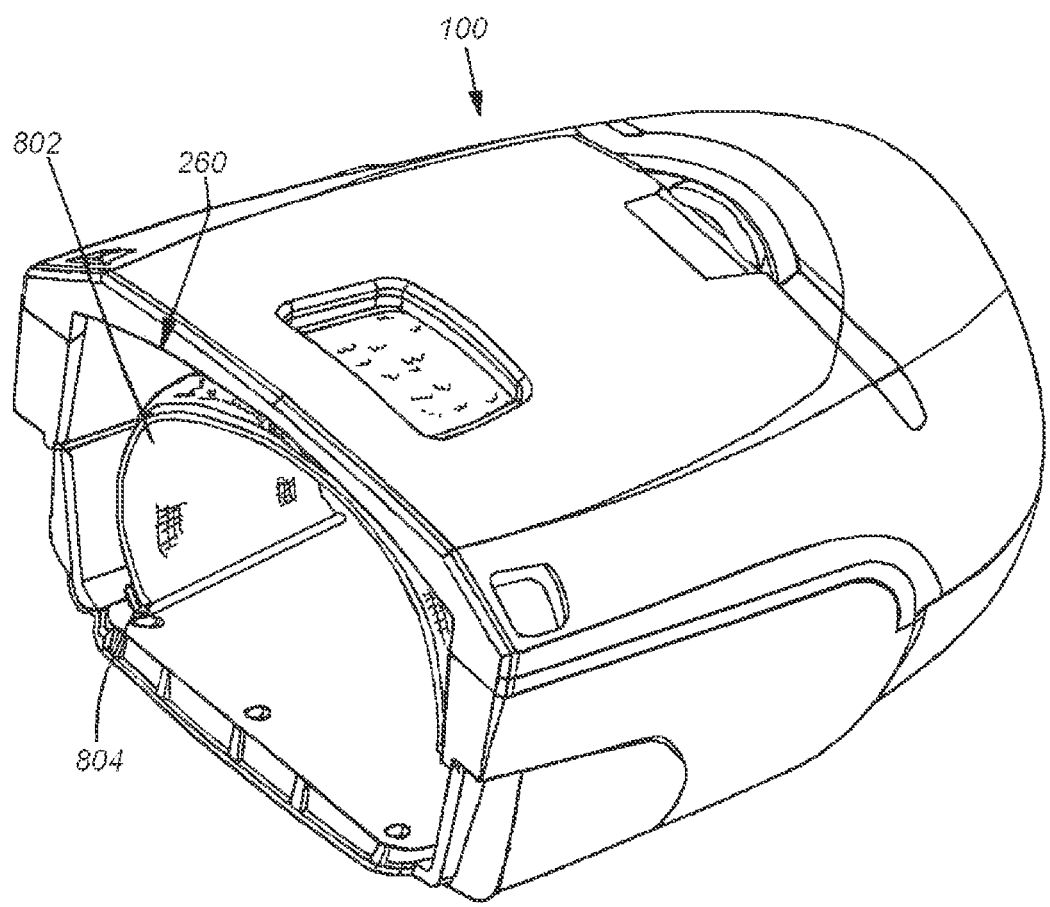
FIG. 8 is a perspective view of a slide projector housing according to an alternate embodiment.

FIG. 8 is a perspective view of a slide projector housing device according to an alternate embodiment. For the purpose of simplification, this embodiment uses like reference numbers with respect to like elements of the embodiment described above. An optionally removable elastic strap mechanism 802 secures the strobe 102 (as shown in FIG. 2) within the housing device 100. The elastic strap can be made from any flexible material or combination of flexible materials, including rubber or plastic and woven textile. The elastic strap can include elastic webbing formed integrally with, or as a separate component from, the elastic material.

Depending on the materials used and prevailing market conditions, the strap mechanism can be less costly to manufacture, and repair or replace compared to some embodiments. The elastic strap comprises a continuous circular band, where the bottom portion extends through apertures 804 in a plate located in the base of the housing device 100 and is secured by fasteners. In an alternate embodiment, the elastic strap comprises two ends that are stitched or glued together to prevent fraying and secured to the bottom of the housing device 100 by one or more fasteners. In another alternate embodiment, the strap is separable above the emitting end of the strobe, and can be secured or tightened via hook and loop fasteners attached to the top of the band. Alternatively, buckles, buttons, other fasteners known in the art can be used.

The strap extends into the aperture far enough to substantially cover the sides of the emitting end of the strobe body. A friction inducing material can be added to the inside surface of the strap to provide a stronger hold around the emitting end of the strobe. The friction inducing material can be elongated stripes or a uniform coating, and can be comprised of rubber, a rubberized plastic, or a similar material. In alternate embodiments, the strap may extend further into the aperture to provide a more secure fit for some strobes. In another alternate embodiment, two or more parallel straps may be used to facilitate ventilation and strobes having a longer emitting end. In still other alternate embodiments, the strap may be thick, or comprise two or more bands on top of each other to provide additional hold and durability.

The strap mechanism 802 engages the rear of the strobe body, and can bias the strobe body forwardly into the aperture. The strap frictionally secures the strobe with precision, and is not limited to predetermined height increments. More particularly, the elastic strap fits securely around the top of the strobe at any height below the top 260 of the housing and pulls the strobe downwardly toward the base of the housing device 100 and forwardly into the aperture.

The foregoing has been a detailed description of illustrative embodiments of the invention. Various modifications and additions can be made without departing from the spirit and scope of this invention. Features of each of the various embodiments described above can be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein various directional and orientational terms such as "vertical", "horizontal", "up", "down", "bottom", "top", "side", "front", "rear", "left", "right", and the like, are used only as relative conventions and not as absolute orientations with respect to a fixed coordinate system, such as gravity. As noted above, the projected image can be altered by use of filters, applied coatings, rotation of the projected image, less or more focus and greater or lesser light. The slide housing can be placed into the housing vertically or laterally. In other embodiments, the emitted image can be provided by pulsed light, varied strength or steady light. The combined image is thereby a variable synthesis of projection and light and can be efficaciously interpreted by the photographer so as to surpass the mere visual representation of image and become artistic expression. It is contemplated that one or more such slide projection systems can be combined for multiple images and artistic effects. Additionally, while the housing includes a lens mount adapted to a particular commercial mount standard, it is expressly contemplated that the housing can be provided with an industry standard (or customized) removable adapter or mount base (e.g. a clip-in mount base) that allows differing types of lenses/mounts to be employed with the same housing. It is further contemplated that an elastic strap mechanism may secure the strobe to the housing by reaching behind the strobe and pulling it toward the housing aperture. Accordingly, this description is meant to be taken only by way of example, and not to otherwise limit the scope of this invention.

What is claimed is:

1. A system for a slide projection housing device with a mount for a detachable lens and strobe comprising:
   a housing having a slot for removably inserting a holder for mounting a transparent media with an image thereon;
   an aperture for removably inserting a strobe light; and
   a mounting base for removably attaching a lens, wherein the strobe selectively projects a light through the transparent media and the lens for projection onto a remote surface,
   wherein the housing includes a movable member constructed and arranged to selectively engage and secure the strobe in the aperture.

2. The system as set forth in claim 1 wherein the strobe light projects light into the slide projection housing.

3. The system as set forth in claim 2 wherein the transparent media is at least one of a framed photographic slide, unframed photographic slide and printed transparency.

4. The system as set forth in claim 1 wherein the movable member includes an elastic strap constructed and arranged to engage and secure the strobe in the aperture.

5. The system as set forth in claim 4 wherein the elastic strap comprises opposing ends having hook and loop fasteners constructed and arranged to tighten and secure the strap around an emitting end of the strobe.

6. The system as set forth in claim 1 wherein the housing includes a base for mounting to either a tripod or a light stand.

7. The system as set forth in claim 1 wherein the slide holder is constructed and arranged to receive at least one of a framed photographic slide, unframed photographic slide and printed transparency thereinto.

8. The system as set forth in claim 1 wherein the slide holder defines a first face and a second face, each constructed and arranged to receive the photographic slide therebetween.

9. A system for a slide projection housing device with a mount for a detachable lens and strobe comprising:
a housing having a slot for a removably inserting a holder for mounting a transparent media with an image thereon;
an aperture for removably inserting a strobe light; and
a mounting base for removably attaching a lens, wherein the strobe selectively projects a light through the transparent media and the lens for projection onto a remote surface,
wherein the slide holder defines a first face and a second face, each constructed and arranged to receive the photographic slide therebetween, and
wherein the first face includes first alignment structures and the second face includes second alignment structures constructed and arranged to engage the first alignment structures when the first face is engaged to the second face.

10. The system as set forth in claim 9 wherein at least one of the first face and the second face includes spring tabs that pressurably engage a portion of the slot.

11. The system as set forth in claim 9 wherein the strobe light projects light into the slide projection housing.

12. The system as set forth in claim 11 wherein the transparent media is at least one of a framed photographic slide, unframed photographic slide and printed transparency.

13. The system as set forth in claim 9 wherein the housing includes a movable member constructed and arranged to selectively engage and secure the strobe in the aperture.

14. The system as set forth in claim 9 wherein the housing includes an elastic strap constructed and arranged to engage and secure the strobe in the aperture.

15. The system as set forth in claim 14 wherein the elastic strap comprises opposing ends having hook and loop fasteners constructed and arranged to tighten and secure the strap around an emitting end of the strobe.

16. The system as set forth in claim 9 wherein the housing includes a base for mounting to either a tripod or a light stand.

17. The system as set forth in claim 9 wherein the slide holder is constructed and arranged to receive at least one of a framed photographic slide, unframed photographic slide and printed transparency thereinto.

* * * * *